April 16, 1935.   H. C. LORD   1,997,908
METHOD OF CURING PLASTIC ARTICLES
Original Filed Sept. 22, 1930
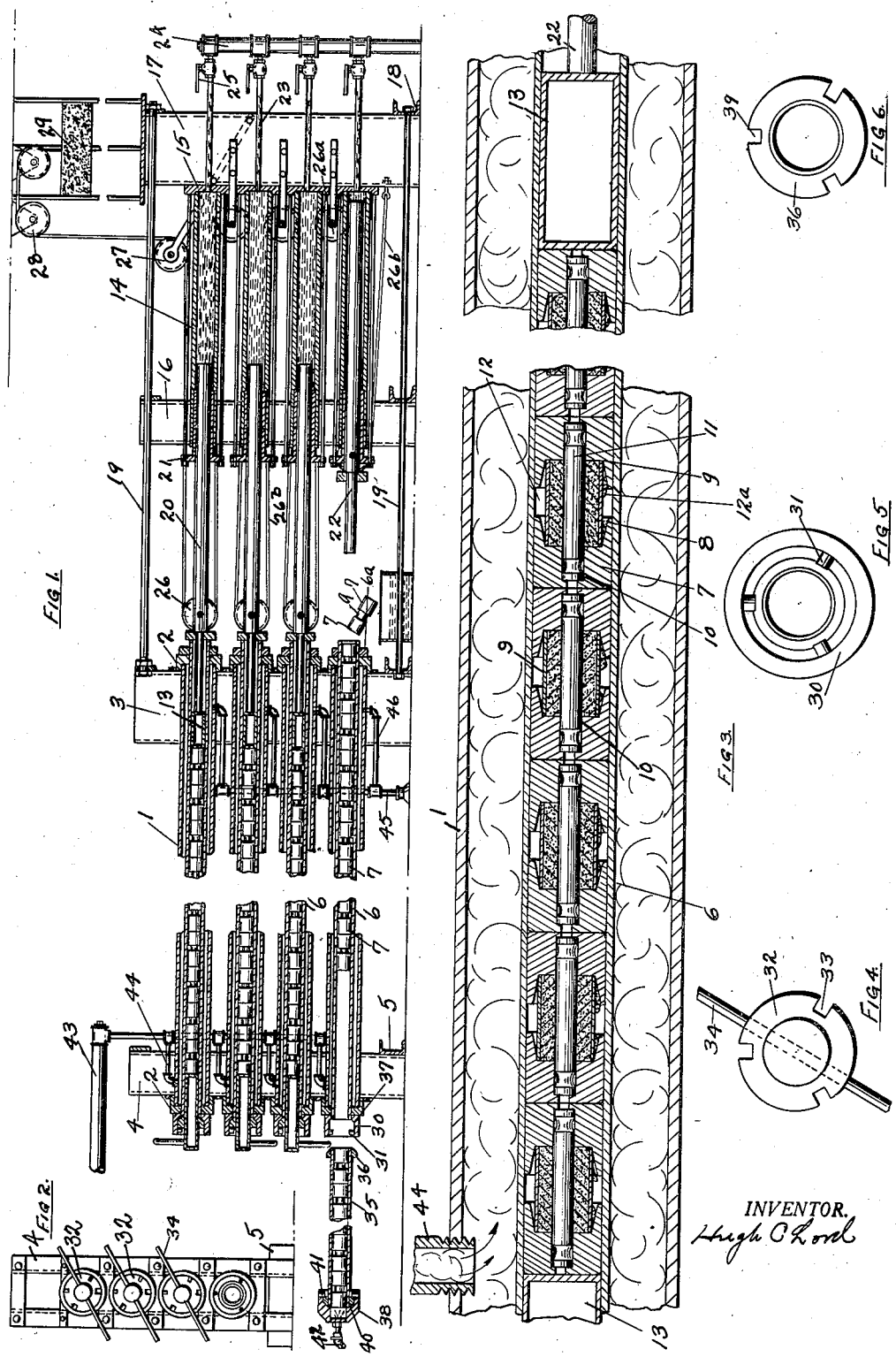
INVENTOR.
Hugh C Lord Patented Apr. 16, 1935

1,997,908

UNITED STATES PATENT OFFICE 1,997,908

METHOD OF CURING PLASTIC ARTICLES

Hugh C. Lord, Erie, Pa.

Application September 22, 1930, Serial No. 483,461
Renewed September 14, 1934

11 Claims. (Cl. 18—59)

The particular exemplification of the invention is intended to cure rubber and in its preferred embodiment is arranged to cure rubber forming a wall between a central pin and an outer shell. Heretofore such articles have been ordinarily cured by placing them in a mold with the shell in contact with the wall of the mold and exerting pressure on the ends of the rubber. Usually this has been accomplished with a number of such molds arranged side by side with a single source of pressure closing each of the spaces. Such structures and methods of vulcanizing these articles are subject to serious objections, as with most articles of this kind it is desirable to subject the rubber adjacent to the center to at least as great temperature as the rubber toward the shell and where the shell is brought into immediate contact with the wall of the mold it has a higher temperature than at the pin so that unless compensation is provided by compounding, which is often difficult, the rubber is softer at the pin than at the shell which is just the reverse of what, under ordinary conditions, should exist because the mass of rubber at the pin is much less than that at the shell.

Further where a number of articles are vulcanized together, side by side, it is very difficult to get them all within such close tolerances that the closure on all of them is uniform. For this reason it has been common to bottom the mold on the central pin which is usually better capable of sustaining the pressure than the shell. This has permitted the over-flow of rubber to the space between the shell and the mold, thus making it difficult to remove the articles from the mold and also to maintain a proper molding pressure on the rubber during vulcanization. With the present invention, the articles are arranged so as to receive their direct heat for vulcanization from the ends, the shells being spaced from the heat-exchanging walls. Inasmuch as the central pin is usually of an area more readily conveying heat the temperature at the pin may be maintained equal to that at the shell. This spacing the shell from the walls also provides a space for an over-flow of rubber which obviates the nice proportioning, or weighing of the rubber for the space, and thus simplifies fabrication.

In the present invention, in the preferred form, caps are provided which engage the ends of the articles and these caps are arranged in a series guided preferably by a steam-heated tube so that when pressure is exerted on the end of the series all of the series receive the same pressure regardless of small differences in the lengths of the articles. This makes it possible to permit of very much larger tolerances and simplifies the fabrication. It also makes it possible to assure the amount of pressure with which the rubber is sealed in the space within the shell and thus it is possible to proportion the pressure to the capacity of the shell to sustain it. It also makes it possible to so arrange the pin and shell that the bottoming of the caps will be on the shell so that there is a direct sealing closure of the cap on the shell with a permissible over-flow to the point of closure. Without such a regulated pressure as is possible with a single source of pressure on the series in tandem there would be more or less upsetting of the shell and with such upsetting, of course, a mis-sizing of the shell and if there were a close fit in the mold great difficulty in removing the articles.

The invention also involves a convenient means of loading and discharging the molds.

Features and details of the invention will appear more fully from the specification and claims.

A preferred embodiment of the invention and the manner of practicing the process is illustrated in the accompanying drawing as follows:—

Fig. 1 shows a central section through the apparatus.

Fig. 2 an end view of the apparatus.

Fig. 3 an enlarged view of one of the curing tubes.

Fig. 4 an end view of the stop.

Fig. 5 an end view of the socket receiving the stop.

Fig. 6 an end view of the loading tube.

1 marks the tubular cases forming the steam chamber. These are provided with heads 2. The cases are arranged between uprights 3 and 4, the heads engaging the uprights. The cases are supported in a convenient manner in slightly spaced relation between the posts. The posts are connected by cross pieces 5. Guide tubes 6 are arranged within the cases. They extend from head to head and form a closure with the head so as to form an annular steam space within the case. They are secured by nuts 6a. Caps 7 are arranged along the tube, end to end. These caps have tapered sockets 8, the bottoms of which engage the ends of shells 9 and the periphery at the bottom centers the shell. The caps are also provided with central sockets 10 which are adapted to receive the ends of the center pins 11. These sockets locate the pins within tolerances endwise and also center the pins. Preferably the relation between the ends of the pins and their sockets and the ends of the shells, and the tapered sockets is such that the bottoming pressure is received by the ends of the shells. A space 12 is provided around the shells and between the shells and the heated guide tube 6, and the over-flow 12a of rubber runs into this space and is vulcanized without pressure and may be readily detached. Pressure blocks 13, preferably air insulated, are arranged at the ends of the series. Ram cylinders 14 have their rear ends closed by heads 15. They are arranged between posts 16 and 17 and have their axes coincident with the tubes 6. The posts are connected by cross posts 18 and the thrust is sustained by a strain rod 19 connecting the posts 3 and 17. Plungers 20 are arranged in the cylinders. These pass through stuffing boxes 21 and are provided with ends 22 which, when the plungers are advanced extend into the tube 6 and exert pressure on the end block 13 and consequently on the series of caps and joints. Fluid pressure is communicated through pipe 23 which is connected with a supply pipe 24, the pipes 23 being controlled by valves 25. Pulleys 26 are arranged on the plungers 20 and stationary pulleys 26a are arranged at each side of and adjacent to the cylinders. Cords 26b are woven back and forth between these pulleys and carried around guide pulleys 27 and 28 and secured to a weight 29. The purpose of this weighted cord is to retract the plungers.

A stop socket 30 is arranged at the rear end of each of the tubes opposite the plungers. These have inward projections 31 and a stop plug 32 having grooves 33 which permit them to be passed by the projections 31 and turned in the manner of a bayonet joint by means of a handle 34 so as to form a stop back of the end of the series of joints. Preferably the insulated plug 13 at this end of the mold is directly attached to the stop.

In order to conveniently load the guide tubes the joints are placed in a loading tube 35. This tube has an end 36 which is adapted to close on a seat 37 in the bottom of the socket 30. It has grooves 39 which may be locked on the projections 31 so as to maintain the loading tube in sealed connection with the guide tube. The opposite end of the loading tube has a head 38 which is provided with a socket 40 with inwardly extending pins 41 adapted to enter the grooves 39 of a head 36 at that end of the tube. A fluid supply, preferably air, is provided through a pipe 42 connected with the head 38. In order to empty the guide tube in which the vulcanization is completed a filled loading tube is connected, air supplied at the end of the loading tube and this driving forward discharges the vulcanized articles. At the completion of the movement of the incoming tubes the air is shut off and the loading tube removed, the stop plug inserted, the plunger again advanced and the vulcanizing operation started.

At the completion of the operation the plunger is retracted and the joints retarded in the manner specified. Steam is delivered to the cases through the pipe 43 from which the branch pipes 44 extend. Drainage is taken care of through a pipe 45 to which the branch pipes extend from each case.

With this structure a very simple apparatus may be provided giving a very large capacity in a comparatively small space and in a very inexpensive manner. The water consumption on the plungers is very much reduced over the molds arranged in parallel in that a single column of water having the cross area of the plunger is used for a great many joints, whereas a similar amount of water would be used in the parallel system for each joint.

What I claim as new is:—

1. The method of curing plastic articles having outer shells, centering pins, and an intervening wall of plastic, which consists in placing articles in single series in tandem relation, enclosing said articles within a heat exchanging medium but spaced therefrom, providing a heat exchange from the medium to the ends of the pins and shell, closing the spaces between the pins and shells, and exerting pressure on the ends of the plastic.

2. The method of curing plastic articles having outer shells, centering pins, and an intervening wall of plastic, which consists in placing articles in single series in tandem relation, enclosing said articles within a heat exchanging medium but spaced therefrom, providing a heat exchange from the medium to the ends of the pins and shells, closing the spaces between the pins and shells, exerting pressure on the ends of the plastic, and limiting the closing action by a bottoming on the shells.

3. The method of curing a plastic article having an outer shell and a central pin with an intervening wall of plastic, which consists in enclosing the article within a heat exchanging medium but spaced therefrom, closing the spaces between the ends of the pin and the shell, providing a heat exchange from the medium to the ends of the pin and shell, and exerting pressure on the ends of the article.

4. The method of curing a plastic article having an outer shell and a central pin with an intervening wall of plastic, which consists in enclosing the article within a heat exchanging medium but spaced therefrom, closing the spaces between the ends of the pin and the shell, providing a heat exchange from the medium to the ends of the pin and shell, exerting pressure on the ends of the article, and limiting the closing action by a bottoming on the shell.

5. The method of curing plastic articles having thin walled outer shells, centering pins, and an intervening wall of plastic, which consists in placing articles in single series in tandem relation, enclosing said articles within a heat exchanging medium but spaced therefrom, providing a heat exchange from the medium to the ends of the pins and shells, closing the spaces between the pins and shells, exerting pressure on the ends of the plastic, limiting the closing action by a bottoming on the shells, and controlling the pressure to correspond with the pressure capacity of the wall of the shells.

6. The method of curing plastic articles having a central pin and a surrounding wall of plastic which consists in placing the articles in a single series in tandem relation, enclosing said articles with the surrounding molds in a heat exchanging medium, but with the molds spaced therefrom, providing a heat exchange from the medium to the ends of the article; and exerting pressure on the article in such tandem relation.

7. The method of curing plastic articles having a central pin and a surrounding wall of plastic which consists in placing the articles in a single series in tandem relation, enclosing said articles with the surrounding molds in a heat exchanging medium, but with the molds spaced therefrom, providing a heat exchange from the medium to the ends of the article, exerting pressure on the articles in such tandem relation, and limiting the pressure by a bottoming pressure on the molds.

8. In a plastic curing apparatus, the combination of a mold comprising opposing end closure caps adapted to engage and center an outer shell and a central pin within the shell and with the shell spaced inwardly from the outer edge of the caps and to transfer heat to the shell and to the pin; a guiding means in heat exchanging relation with the caps holding the caps in concentric relation; and a pressure device exerting pressure on the caps.

9. In a plastic curing apparatus, the combination of a mold comprising opposing end closure caps having outer sockets spaced inwardly from their edges and adapted to receive and center and bottom on an outer shell and inner sockets within the outer sockets adapted to receive an inner pin, said caps being adapted to convey heat to the pin and shell; a guiding means in heat exchanging relation with the caps holding the caps in concentric relation; and a pressure device exerting pressure on the caps.

10. In a plastic curing apparatus, the combination of a plurality of pairs of end closure caps each pair being adapted to engage and center an outer shell and a central pin within the shell and with the shell spaced inwardly from the outer edge of the caps and to transfer heat to the shell and to the pin; a guiding means in heat exchanging relation with the caps holding the caps in concentric relation; and a pressure device exerting pressure in tandem on the caps.

11. In a plastic curing apparatus, the combination of a plurality of pairs of end closure caps, each pair having outer sockets spaced inwardly from their edges and adapted to receive and center and bottom on an outer shell and inner sockets within the outer sockets adapted to receive an inner pin, said caps being adapted to convey heat to the pin and shell; a guiding means in heat exchanging relation with the caps holding the caps in concentric relation; and a pressure device exerting pressure in tandem on the caps.

HUGH C. LORD.